US008548394B2

(12) United States Patent
Christensen

(10) Patent No.: US 8,548,394 B2
(45) Date of Patent: Oct. 1, 2013

(54) ANTENNA FOR A WIRELESS CONTROLLER IN ORAL CAVITY

(75) Inventor: Henrik Vie Christensen, Dronninglund (DK)

(73) Assignee: TKS A/S, Aalborg (DK)

( * ) Notice: Subject to any disclaimer, the term of this patent is extended or adjusted under 35 U.S.C. 154(b) by 250 days.

(21) Appl. No.: 13/168,504

(22) Filed: Jun. 24, 2011

(65) Prior Publication Data

US 2012/0329406 A1 Dec. 27, 2012

(51) Int. Cl.
*H04B 1/38* (2006.01)
*H04B 1/034* (2006.01)

(52) U.S. Cl.
USPC .......................................... 455/90.1; 455/100

(58) Field of Classification Search
USPC ............. 455/90.1, 100; 340/4.1, 4.11, 539.1, 340/539.12; 341/21; 600/373, 393, 546, 600/590
See application file for complete search history.

(56) References Cited

U.S. PATENT DOCUMENTS 4,629,424 A * 12/1986 Lauks et al. ...................... 433/6
5,212,476 A * 5/1993 Maloney ...................... 340/4.11
6,598,006 B1 * 7/2003 Honda et al. .................. 702/116
2009/0051564 A1 * 2/2009 Najanguaq Sovso Andreasen Strujik ..................... 340/825.19
2010/0007512 A1 * 1/2010 Ghovanloo et al. ...... 340/825.19

FOREIGN PATENT DOCUMENTS

EP 1868542 A2 12/2007

* cited by examiner

*Primary Examiner* — Ping Hsieh
*Assistant Examiner* — Xin Jia
(74) *Attorney, Agent, or Firm* — Nath, Goldberg & Meyer; Jerald L. Meyer

(57) ABSTRACT

An intraoral cavity control system having a shape adapted to be positioned between the palate in the roof of the mouth and the tongue comprising, a control interface to receive control input from an organ of the mouth, a wireless transmitting and/or receiving means for transmitting an electrical output signal from the control system and/or for receiving an electrical input signal from an external unit, a control element for processing the control input from the control interface into said electrical output signal transmitted by the transmitting means and for processing said electrical input signals establishing a communication between the external unit and the control element, a power source for providing electrical power to said control system wherein the wireless transmitting and receiving means are further provided with an antenna that is arranged to extend from within a first volume of the oral cavity bound by the medial surface of the teeth and being arranged within a second volume of the oral cavity bound between the medial surface of the teeth and the lateral boundaries of the vestibule of the oral cavity.

13 Claims, 2 Drawing Sheets

ANTENNA FOR A WIRELESS CONTROLLER IN ORAL CAVITY

FIELD OF THE INVENTION

An intraoral cavity control system having a shape adapted to be positioned between the palate in the roof of the mouth and the tongue comprising, a control interface to receive control input from an organ of the mouth, a wireless transmitting and/or receiving means for transmitting an electrical output signal from the control system and/or for receiving an electrical input signal from an external unit, a control element for processing the control input from the control interface into said electrical output signal transmitted by the transmitting means and for processing said electrical input signals establishing a communication between the external unit and the control element and a power source for providing electrical power to said control system.

BACKGROUND

As electronic components and computers are being increasingly implemented into a number of various systems used on a daily basis by users, there is a constantly increasing need to optimise user interfaces between the users and the electronic systems or computers. A common mode of interfacing between electronic systems and computers is using a combination of hand or finger control and vision, such as keyboards, mice, touch screens, track pads, etc., where the user utilises the hands or the fingers to control a system.

However, there are a number of users that are not capable of utilising conventional means for interacting with an electronic system due to a reduced or minimal dexterity of the body's appendages. This may be the situation with persons having spinal cord injuries and/or para- or tetraplegics, who do not have the possibility of using their fine motoric skills to interact with electronic systems due to the minimised or non-existent nerve communication between the appendages and the spinal cord and/or brain.

A number of various interface systems have been developed for persons that have decreased motor skills in their appendages, such as voice control systems, blow tube systems, electromyographical (EMG) systems, brain-computer interfaces and so on.

One type of system having been developed is a tongue control system, as disclosed in EP 1 868 542, which provides a method and a system for tongue-based control of computer and/or aids, particularly for severely disabled persons, who want or require control of their aids, such as wheelchairs, etc. This control system comprises a control unit and sensors, which are introduced into the oral cavity and are arranged in the roof of the mouth, e.g. the palate, where the user can interact with the sensors using the tip of the tongue. The interaction between the tip of the tongue and the sensors is registered by the control unit as a control input and is transmitted to an external controller. The external controller transforms the signals into a control output, which is input into a computer or into any electronically controlled aid that may be used by the user.

The means for transmitting the control input signals from the control unit to the external controller have been tested, such as having a wired connection using electrical leads between the control unit and the external controller. However, there are drawbacks to such system as the electrical leads have to be led from inside the body, from the oral cavity, and to the outside of the body. Often, this has been done by threading the leads from the oral cavity, past the teeth and out through the oral opening, or the mouth. This may cause the user discomfort and may furthermore be aesthetically unattractive to the user.

Hence, the developers have come up with a solution that uses wireless transmission between the control unit and the external device, where a wireless controller and a transmittal and/or receiving antenna is built into the control unit and wirelessly transmits the control input to the external device.

Another issue that affects the developers of systems arranged inside the oral cavity is the environment in which such a system is to be used. The vast majority of electronic components that are used to construct such control systems are not designed to withstand the corrosive effects of saliva or spittle, which has a vast content of degenerative enzymes intended for initiating the digestive process of foods introduced into the mouth, or the corrosive effects of the stomach acids that may enter the oral cavity via the oesophagus due to gastric reflux or similar. This means that advantageously, the electronics are to be enveloped in a protective enclosure, which protects the electronic components from corrosion that may occur inside the oral cavity.

The power consumption of a wireless device, such as the control unit, has to be considered as it is important that the control unit is not powered by a large battery that may increase the size of the apparatus introduced into the oral cavity, and the external dimensions of the apparatus is advantageously kept at a minimum to minimise the discomfort such a device may cause. Furthermore, the minimisation of the effect such an apparatus may have on the speech of the person using it may be considered a factor as the oral cavity, and especially the palate, are intricate parts of the speech organs.

U.S. Pat. No. 5,212,476 discloses the use of a wireless transmittal antenna attached to a transceiver. The transceiver is part of an intraoral controller provided with EMG electrodes, which are adapted to capture EMG signals from the muscles of the tongue. The antenna is in the form of a wire extending outside the mouth so that the wireless signals do not cause interference with the EMG signals. However, as the disclosed antenna is a wire that extends out of the oral cavity and the mouth, it may cause the user discomfort and has an aesthetical profile that may cause the user distress as the user has a wire hanging out of the mouth during use.

General Description

An object of the invention is to provide an intraoral cavity control system having a shape adapted to be positioned between the palate in the roof of the mouth and the tongue comprising, a control interface to receive control input from an organ of the mouth, a wireless transmitting and/or receiving means for transmitting an electrical output signal from the control system and/or for receiving an electrical input signal from an external unit, a control element for processing the control input from the control interface into said electrical output signal transmitted by the transmitting means and for processing said electrical input signals establishing a communication between the external unit and the control element, a power source for providing electrical power to said control system, wherein the wireless transmitting and receiving means are further provided with an antenna that is arranged to extend from within the first volume of the oral cavity bound by the medial surface of the teeth and being arranged inside the second volume of the oral cavity bound between the medial surface of the teeth and the lateral boundaries of the vestibule of the oral cavity.

Within the meaning of the invention, the term "vestibule" or its Latin name vestibulum oris means a slit-like space, bounded externally by the lips and cheeks and internally by the gums and teeth. It communicates with the surface of the body by the rima or orifice of the mouth. Hence, the vestibule is the area between the lips and cheeks and the teeth.

Conventionally, the protective enclosure, which covers the control unit, has been arranged to enclose the wireless controller and the transmittal/receiving antenna for protection, and the material of the protective enclosure dampens the wireless signal to such a degree that the gain of the signal has to be increased, which in turn increases the power consumption of the control unit considerably.

The inventors realised that as regards wireless transmission between the intraoral control system and an external device, there are a number of challenges with regard to the quality of the wireless transmission. The antenna had been embedded in the protective enclosure, which meant that the antenna signal for transmission was dampened significantly and that for consistent quality, the signal strength had to be increased, the external device moved closer to the control system for reception of the transmitted signal, or other methods of ensuring signal quality had to be performed. However, these solutions could be considered adequate for a number of reasons, but for the inventors these solutions were inadequate for their purposes. The reason for this is that by e.g. increasing the signal strength, it would not facilitate the receiving of the wireless trans-mission as the protective enclosure dampened the signal transmission both ways.

Furthermore, the wireless signals for the intraoral control system are likewise dampened through bodily tissue, where the bone tissue of the skull and the teeth have a significant effect on the signal strength when travelling through the tissue as documented in *Wireless Communication with Medical Implants: Antennas and Propogation*, Anders J. Johansson, June 2004, Competence Centre for Circuit Design at Lund University.

One solution to this problem is to increase the signal transmission power in the control system and the external device. However, the inventors regarded this solution as being potentially harmful to the user, and this would increase the risk of crosstalk or interference with other devices operating on a similar frequency band. The frequency bands in question, in which the control system may operate, are conventional frequency bands used for wireless communications such as: 2.4 GHz, 400 MHz (401-406 MHz medical band and/or 433-434 MHz ISM band), 868 MHz (Europe) or 915 MHz (US).

Another issue with the wireless transmission is that when the antenna is inside the oral cavity and is arranged behind the teeth, the teeth may also interfere with the wireless transmission by e.g. dampening the signal or distorting the signal so that the gain of the signal has to be increased to ensure the signal transmission between the control unit and the external controller.

Thus, in order to reduce the dampening effect of the protective enclosure and the bodily tissue, the inventors attempted to move the antenna from within the oral cavity past the teeth and into the volume between the cheeks and lips and the lateral surface of the teeth by extending the antenna from the intraoral control system, which is adapted to be inside the oral cavity arranged close to the palate, as claimed in the characterising part of claim 1. This meant that the signal strength of the wireless transmission signal could be kept relatively low as the dampening effect of the control system and the bone and teeth tissue was minimised and as the signal would not be required to travel through these specific layers causing a dampening to the signal.

A number of users having reduced mobility and decreased motor skills in their appendages still have fully functional or slightly decreased oral motor skills. The inventors needed to ensure that the antenna would not impede the user's ability to communicate orally during the use of the control system. In order to ensure that the antenna did not impede their speech, the antenna was arranged so as not to pass the oral orifice or the mouth opening.

It was surprising to the inventors that the cheeks and lips, even though they do cause a negligible dampening effect, did not cause a significant dampening of the transmitted or received wireless signal, and the signal strength, or gain, could be kept at a relatively low level. This means that the power requirements for the wireless transmission from the control system are minimised as well as the power requirements for wireless transmission of the external device. Furthermore, this means that the risk of crosstalk and signal interruption is reduced compared to a stronger signal.

It should be understood that the antenna of the control system may be arranged in such a way that the antenna does not extend out of the oral orifice, i.e. past the lips of the mouth.

Within the meaning of the present invention, an antenna in reception will intercept some of the power of an electromagnetic wave in order to produce a tiny voltage that the radio receiver can amplify. Alternatively, a radio transmitter will produce a large radio frequency current that may be applied to the terminals of the same antenna in order to convert it into an electromagnetic wave (radio wave) radiated into free space.

Within the meaning of the present invention, the antenna may be arranged together with other types of systems that are arranged inside the oral cavity.

In one embodiment of the invention, the control system may further comprise a housing having a first surface facing the palate in the roof of the mouth and a second surface facing the tongue. The housing may be formed specifically for each user so that a mould is taken of the palate, and the housing is formed in a similar or substantially same shape as the palate in order for the housing to fit well into the roof of the mouth. Furthermore, the second surface, facing the tongue may be provided in a form or a shape so that the user can easily identify the area of the second surface that may operate as the control interface. The identification may be made using protrusions or shapes that define the boundaries of the control interface.

In one embodiment of the invention, the housing may enclose one or more of the parts comprising the control interface, wireless transmitting and receiving means, control element, the power source and at least part of the antenna in order to shield the parts from corrosion or damage. The vast majority of electronic components used for constructing control systems according to the invention are not designed to withstand continuous exposure to the corrosive effects of saliva or spittle, which has a vast content of degenerative enzymes intended for initiating the digestive process of foods introduced into the mouth, or the corrosive effects of the stomach acids that may enter the oral cavity via the oesophagus due to gastric reflux or similar. The antenna may be made of a material capable of withstanding the corrosive effects of the contents of the mouth and may therefore be partly protected by the enclosure, while other parts of the antenna are not enclosed within the enclosure.

In one embodiment of the invention, the antenna may extend from within the housing to the external of the housing. This means that the antenna may be directly coupled to the transmitting and/or receiving element, and where one end of the antenna is inside the housing, and the second end of the antenna is outside the housing. Advantageously, the antenna is long enough to extend from within the housing, and while the control system is arranged inside the mouth, the antenna is long enough to extend outside the lateral surface of the teeth. The length of the antenna outside the housing may be varied based on the user to whom the control system is supposed to be adapted, to be anywhere in the range from 1 to 100 mm, or even longer up to 200 mm if the antenna is bent, or to be adapted to be folded inside the vestibule.

In one embodiment of the invention, the control system may comprise retaining means for maintaining the control system in place within the oral cavity. This means that when the control system is arranged inside the oral cavity, the control system has one or more means for retaining the control system in its optimum position inside the oral cavity. This means that when the system has been inserted into the oral cavity, the user will not have to worry about the movement of the control system relative to the oral cavity, and the user may operate the system without risking that the control system will dislocate itself from its predefined position. This provides a decreased risk that involuntary control input will be registered by the control interface, such as may occur if the control system dislocates and falls onto the means for providing the control input, i.e. the tongue, which could result in an unwanted and potentially dangerous control input. Involuntary control input may be dangerous in cases where the control system is used to manoeuvre an electric wheelchair, as an example, where the control input could move the chair to a hazardous position when the manoeuvring is not expected or wanted.

In one embodiment of the invention, the retaining means may comprise the antenna for the wireless transmitting and receiving means. This means that the antenna and the retaining means may be partly or fully integrated, so that the retaining means may have a dual functionality; firstly, to hold the control system in place and secondly, to function as the antenna for the wireless transmission. Thus, the retaining means may therefore be arranged to extend from within the first volume and into the second volume, as defined in the claims, and the retaining means may be integrated with the antenna, i.e. the antenna is formed to function as the retaining means or the antenna is integrated with the retaining means, i.e. where the antenna is arranged to be a part of the retaining means. The advantage of this is that the design of the control system may be simplified, where one feature of the design has two separate functionalities, which may be beneficial to the user as there are fewer parts of the control system that have to be monitored or maintained during, before or after use. Thus, the user may e.g. have fewer parts of the control system having to be cleaned before or after use, when the cleaning of the retaining means cleans the antenna, and vice versa, and the user does not have to clean two separate parts of the system as would be the case, when the antenna and retaining means would be two separate parts.

In one embodiment of the invention, the retaining means may be a metal wire. This means that the retaining means may be arranged to be formed, shaped or bent in accordance with a specific predefined structure inside the oral cavity. The metal wire may be adapted to fit to the predefined structure so that the control system may be maintained in its position during use. Furthermore, it may be arranged in such way that the control system may be easily inserted or removed from the oral cavity before and after use, respectively. The fit of the metal wire to the predefined structure may be a snap fit where the oral cavity is provided with a cooperating structure, press fit, when the metal wire presses against the predefined structure to wedge the control system inside the mouth, or similar methods.

In one embodiment of the invention, the retaining means may be a substantially rigid structure adapted to envelope at least part of one tooth of the user. This means that to maintain a secure and reliable position of the control system inside the oral cavity, the substantially rigid structure may be in contact with at least one tooth, where the tooth may be seen as a predefined structure inside the oral cavity with which the control system is in contact. The substantially rigid structure may surround the tooth, clamp to the tooth, be arranged in a friction fit to the tooth, be arranged in a form fit with the tooth, or any other suitable way to maintain the retaining means in close and tight contact with the at least one tooth.

In one embodiment of the invention, the substantially rigid structure may be adapted to envelope at least one tooth in at least two opposing lateral areas in the upper jaw. This embodiment may be seen as providing the rigid structure or the retaining means on two opposing sides of the sagittal plane of the body so that the rigid structure or the retaining means are balanced on each side of the control system, which abuts the roof of the mouth. Thus, the control system may be seen as being anchored or retained in two separate areas of the upper jaw, which may increase the quality of how the control system is maintained in its position during use.

In one embodiment of the invention, the antenna may comprise an electrically conductive material, such as a metal, or any other suitable material or composition that allows the antenna to send and receive signals on a predefined frequency band.

In one embodiment of the invention, the antenna may be a monopole antenna. This means that the antenna may be a simple wire, whip, rubber ducky, helical, random wire, or a ground plane antenna. Alternatively, the antenna may be any kind of antenna, such as a dipole antenna, which is capable of receiving and transmitting signals on a predefined frequency band.

In one embodiment of the invention, the antenna may be a electromagnetically coupled antenna. I.e. an antenna that is not galvanically coupled to the transmitter and/or receiver, but may be an inductive or capacitive communication between the antenna and the transmitter and/or receiver of the wireless transmitting/receiving means. This means that the control interface, transmitting means, control element and/or the power source may be completely contained within a housing, and the housing may encapsulate the electrical components completely.

In one embodiment of the invention, the control interface may be an interaction between inductive coils and a magnetic material. Such a control interface has been disclosed in EP 1 868 542 A2, which is hereby incorporated by reference. An inductive control interface operates where the magnetic material interacts with the inductive coils so that the position of the magnetic material in relation to the inductive coils may be computed. This means that the movement of the magnetic material may provide a control input from the user into the control system. By arranging the antenna inside the vestibule of the oral cavity, it is possible to reduce the crosstalk or interference which the interaction between the inductive coils and the magnetic material may have on the transmission on the wireless signals.

Within the meaning of the invention the term magnetic material may be interpreted to mean a ferromagnetic material or a magnetic responsive material. A ferromagnetic material may be e.g. ferrite, steel, permanent magnetic material or other suitable material. A magnetic responsive material may e.g. be copper or gold. All these materials produce a detectable response in a system having an interaction between inductive coils and a magnetic material, where the ferromagnetic material amplifies the magnetic field, and the conductive materials reduce the magnetic field. When choosing a suitable material for an intraoral control system, the choice of material depends on the qualities of the material, such as its bio-compatibility and its resistance to corrosion. A well suited material may e.g. be stainless steel.

BRIEF DESCRIPTION OF DRAWINGS

The invention is explained in detail below with reference to the drawings, in which.

DETAILED DESCRIPTION OF DRAWINGS

Figure 1:
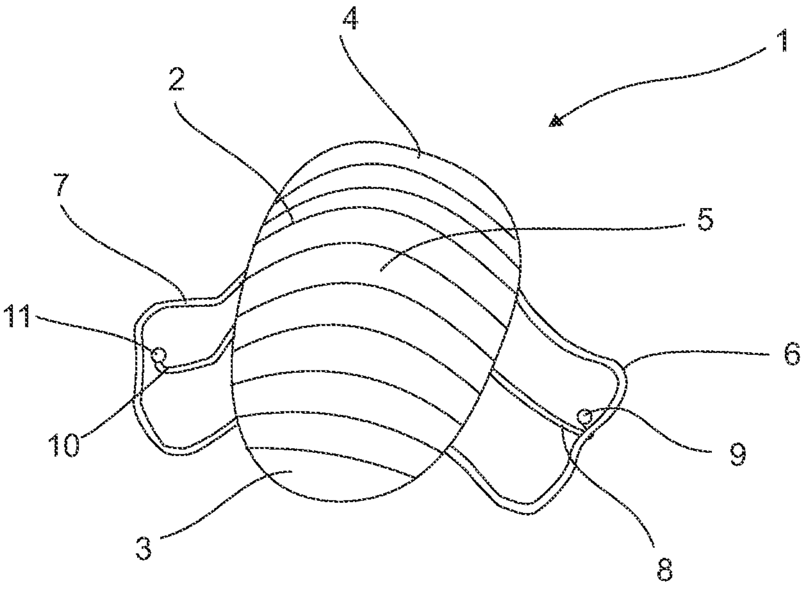
FIG. 1 is a perspective view of an intraoral control system according to the invention.
Figure 3:
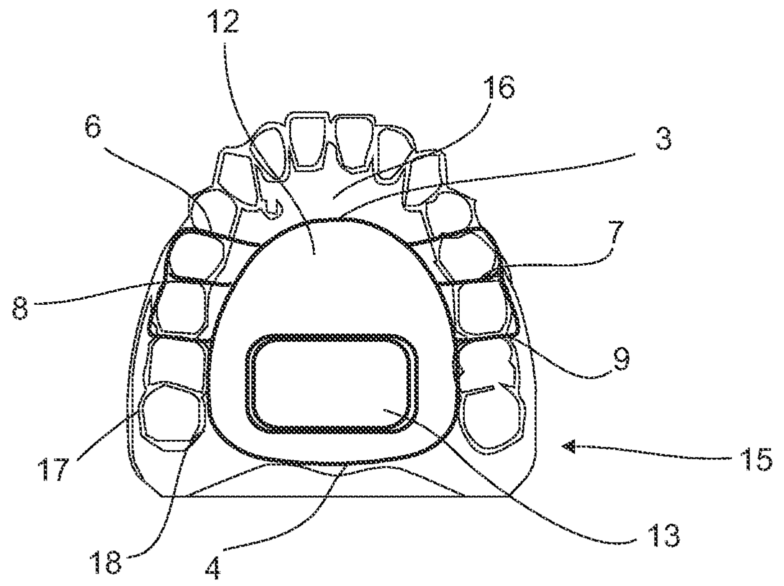
FIG. 3 is a bottom view of an intraoral control system positioned in an upper jaw.

FIG. 1 shows a perspective view of an intraoral control system 1, seen showing a housing 2 having an anterior end 3 and a posterior end 4, which are designed to face the mouth of the user and the throat of the user, respectively. The top surface 5 of the housing 2 is formed and shaped in a shape that may be seen as the inverted shape of the palate of the user so that the top surface 5 fits into the palate of the user. This embodiment is shown having a first retaining means 6 and a second retaining means 7 that are arranged on opposite sides of the housing 2. The retaining means 6,7 are shaped in order to fit around the teeth of the user, as seen in FIG. 3, so that the control system 1 may be maintained in its use position when inserted into the oral cavity. This means that the control system 1 is held in place by the retaining means 6,7, when the retaining means are arranged around the teeth of the user.

Figure 4:
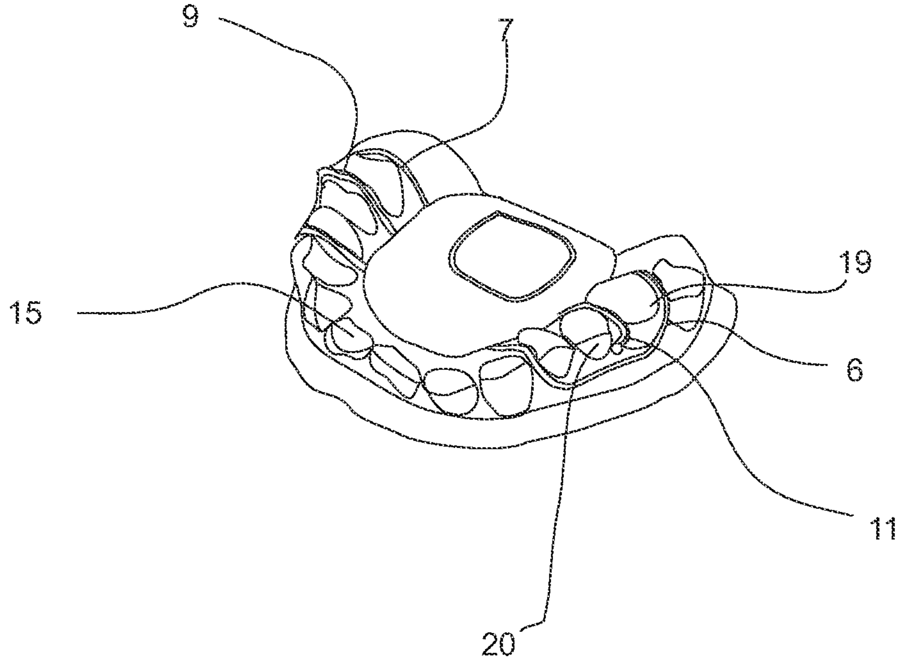
FIG. 4 is a bottom view of an intraoral control system arranged in a cast representing an upper jaw.

Furthermore, this embodiment shows a third retaining means 8 and a fourth retaining means 10, each having a hook-like shape where the tip is a spherical tip 9, 11. The spherical tip is arranged to be press fit between two abutting teeth of the upper jaw to increase the securing of the intraoral control system 1 in the upper jaw of the user, as shown in FIG. 4.

The antenna may comprise or consist of the first 6, second 7, third 8 or fourth 10 retaining means, where the retaining means may be made of a metal wire or wire-like material electrically connected to the wireless transmit and/or receiving module of the intraoral control system 1. The module may be arranged inside the housing 2 of the control system 1. The antenna may be a monopole antenna, which means that only a single one of the retaining means 6,7,8,10 is connected to the transmit and/or receiving module, or that more than one retaining means may be connected to the transmit and/or receiving module to provide a dipole antenna or a multiple pole antenna. The choice of which is optional. Furthermore, the antenna may be arranged inside or alongside the retaining means, in any position, provided that the antenna extends at least past the medial surface of the teeth of the upper jaw.

In another embodiment of the invention, the antenna may be a monopole antenna, where the retaining means 6,7,8,10 are electrically connected, and the two or more of the retaining means are connected to each other. This means that the retaining means may be made of a single unit being wound in a structure so that the single unit comprises two or more of the retaining means, such as a metal wire that is moulded or bent into the shape of two or more of the retaining means. This means that the antenna may be lengthened, and the receiving and transmitting capabilities of the antenna may be increased. In a further embodiment, all of the retaining means may be made of a single unit that is interconnected, i.e. all the retaining means are made of a single metal wire that is moulded or bent into the shape of all of the retaining means.

In accordance with the invention, the retaining means may be formed and shaped into any suitable form, which allows the retaining means to hold the control system in place inside the oral cavity.

Figure 2:
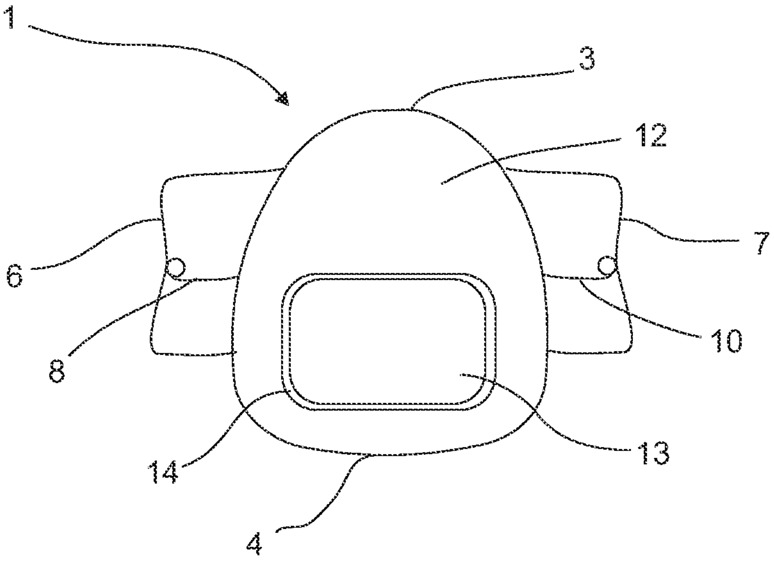
FIG. 2 is a bottom view of an intraoral control system.

FIG. 2 shows a bottom view of an embodiment of the intraoral control system 1 as shown in FIG. 1, where the bottom surface 12 of the system 1 is adapted to face the tongue of the mouth. The bottom surface is provided with a control interface 13, which is in the form of a surface area having a peripheral edge 14 that protrudes from the bottom surface 12 to clearly define the borders of the control interface 13. The control interface may be an interaction between one or more inductive coils and a magnetic material, a touch interface, a mechanical interface, or any type of suitable interfaces, where the tongue is used to control the input into the intraoral control system 1.

FIG. 3 shows a bottom view of the control system 1 as shown in FIG. 1, where the system has been arranged in the palate 16 of the upper jaw 15. The oral cavity may be defined by a first volume that is confined by the medial surface 18 of the teeth 17 and inwards toward the sagittal plane, while the second volume is defined by the medial surface 18 of the teeth 17 and outwards toward the cheeks and the oral orifice (not shown).

FIG. 4 shows a photograph of one embodiment of the control system 1, seen in perspective from the bottom, positioned in the palate (not seen) of a cast representing an upper jaw 15. In this photograph, it is possible to see how a spherical end 11 of the fourth retaining means 10 is positioned between two adjoining teeth 19, 20 in order to press fix the control system 1 inside the palate of the mouth.

The invention claimed is:

1. An intraoral cavity control system having a shape adapted to be positioned between the palate in the roof of the mouth and the tongue comprising,

- a control interface to receive control input from an organ of the mouth,
- a wireless transmitting and/or receiving means for transmitting an electrical output signal from the control system and/or for receiving an electrical input signal from an external unit,
- a control element for processing the control input from the control interface into said electrical output signal transmitted by the transmitting means and for processing said electrical input signals establishing a communication between the external unit and the control element,
- a power source for providing electrical power to said control system, characterised in that the wireless transmitting and receiving means are further provided with an antenna that is arranged to extend from within a first volume of the oral cavity bound by the medial surface of the teeth and being arranged within a second volume of the oral cavity bound between the medial surface of the teeth and the lateral boundaries of the vestibule of the oral cavity.

2. A control system according to claim 1, wherein the control system further comprises a housing having a first surface facing the palate in the roof of the mouth and a second surface facing the tongue.

3. A control system according to claim 2, wherein the housing encloses one or more of the parts comprising the control interface, wireless transmitting and receiving means, control element, the power source and at least part of the antenna in order to shield the parts from corrosion or damage.

4. A control system according to claim 2, wherein the antenna extends from within the housing to the external of the housing.

5. A control system according to claim 1, wherein the control system comprises retaining means for maintaining the control system in place within the oral cavity.

6. A control system according to claim 5, wherein the retaining means comprises the antenna for the wireless transmitting and receiving means.

7. A control system according to claim 5, wherein the retaining means is a metal wire.

8. A control system according to claim 5, wherein the retaining means is a substantially rigid structure adapted to envelope at least part of at least one tooth of the user.

9. A control system according to claim 8, wherein the substantially rigid structure is adapted to surround teeth in at least two opposing lateral areas in the upper jaw.

10. A control system according to claim 1, wherein the antenna comprises an electrically conductive material.

11. A control system according to claim 1, wherein the antenna is a monopole antenna.

12. A control system according to claim 1, wherein the control interface is an interaction between inductive coils and a magnetic material.

13. An antenna to be arranged inside the mouth of a user for wireless transmission and/or reception of signals that is arranged to extend from within a first volume of the oral cavity bound by the medial surface of the teeth and being arranged within a second volume of the oral cavity bound between the medial surface of the teeth and the lateral boundaries of the vestibule of the oral cavity.

* * * * *